(12) United States Patent
Nicolas

(10) Patent No.: US 10,618,606 B2
(45) Date of Patent: Apr. 14, 2020

(54) STREAMER CONNECTING MODULE AND METHOD

(71) Applicant: SERCEL, Carquefou (FR)

(72) Inventor: Frédéric Nicolas, Saint Etienne de Montluc (FR)

(73) Assignee: SERCEL, Carquefou (FR)

( * ) Notice: Subject to any disclaimer, the term of this patent is extended or adjusted under 35 U.S.C. 154(b) by 307 days.

(21) Appl. No.: 15/793,465

(22) Filed: Oct. 25, 2017

(65) Prior Publication Data

US 2019/0118911 A1   Apr. 25, 2019

(51) Int. Cl.
| | |
|---|---|
| B63B 21/66 | (2006.01) |
| G01V 1/38 | (2006.01) |
| B63B 35/04 | (2006.01) |
| H01R 13/523 | (2006.01) |
| G01V 1/20 | (2006.01) |

(52) U.S. Cl.
CPC ............. B63B 21/66 (2013.01); B63B 35/04 (2013.01); G01V 1/201 (2013.01); G01V 1/3826 (2013.01); H01R 13/523 (2013.01); *G01V 1/3808* (2013.01); *G01V 1/3852* (2013.01); *G01V 2001/204* (2013.01)

(58) Field of Classification Search
CPC ............. G01V 1/201; G01V 1/3826; G01V 2001/204; G01V 1/3808; G01V 1/3852; H01R 13/523; B63B 35/04; B63B 21/66

USPC .......................................................... 367/20
See application file for complete search history.

(56) References Cited

U.S. PATENT DOCUMENTS

| | | | |
|---|---|---|---|
| 3,422,390 A * | 1/1969 | Tucker | H01R 13/6276 439/348 |
| 4,260,211 A | 4/1981 | Mollere | |
| 4,351,036 A | 9/1982 | Mollere | |
| 5,692,918 A | 12/1997 | Hill | |
| 9,475,553 B2 | 10/2016 | Roger et al. | |

OTHER PUBLICATIONS

Extended European Search Report in European Application No. EP 18 30 6299 dated Mar. 21, 2019.

* cited by examiner

*Primary Examiner* — Daniel L Murphy
(74) *Attorney, Agent, or Firm* — Patent Portfolio Builder PLLC

(57) ABSTRACT

Method and streamer connecting module for connecting streamer sections to each other. The streamer connecting module includes a housing extending along a longitudinal axis (L) so that first and second ends are opposite to each other; a first streamer connecting part fixedly attached at the first end of the housing; a second streamer connecting part fixedly attached at the second end of the housing; first plural balls located between the first streamer connecting part and the first end of the housing; and a first conduit formed at an interface between the first streamer connecting part and the first end of the housing for accommodating the first plural balls.

18 Claims, 5 Drawing Sheets

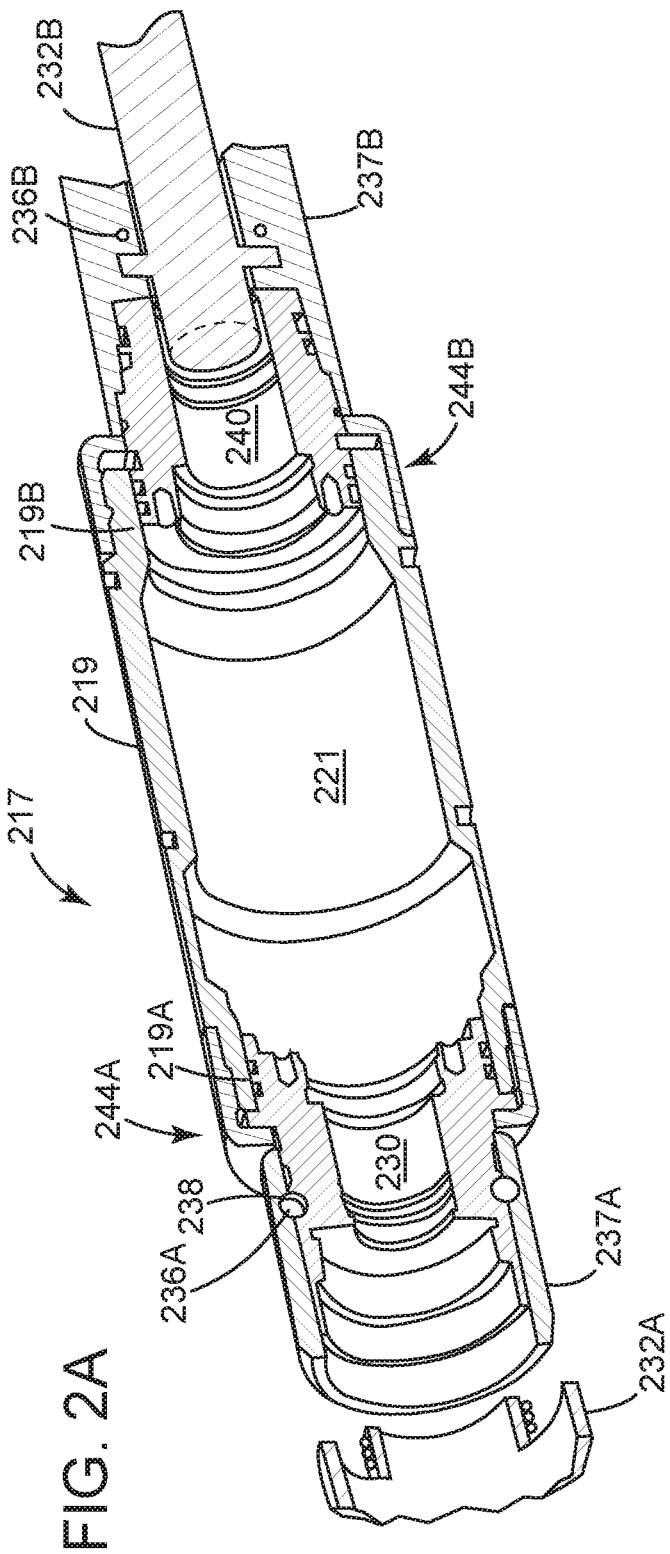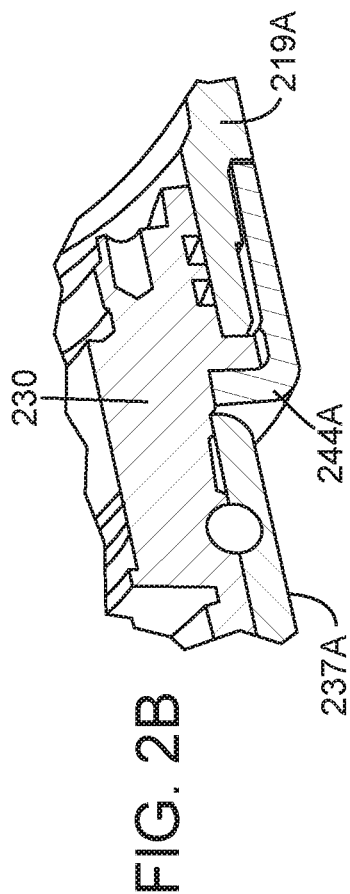

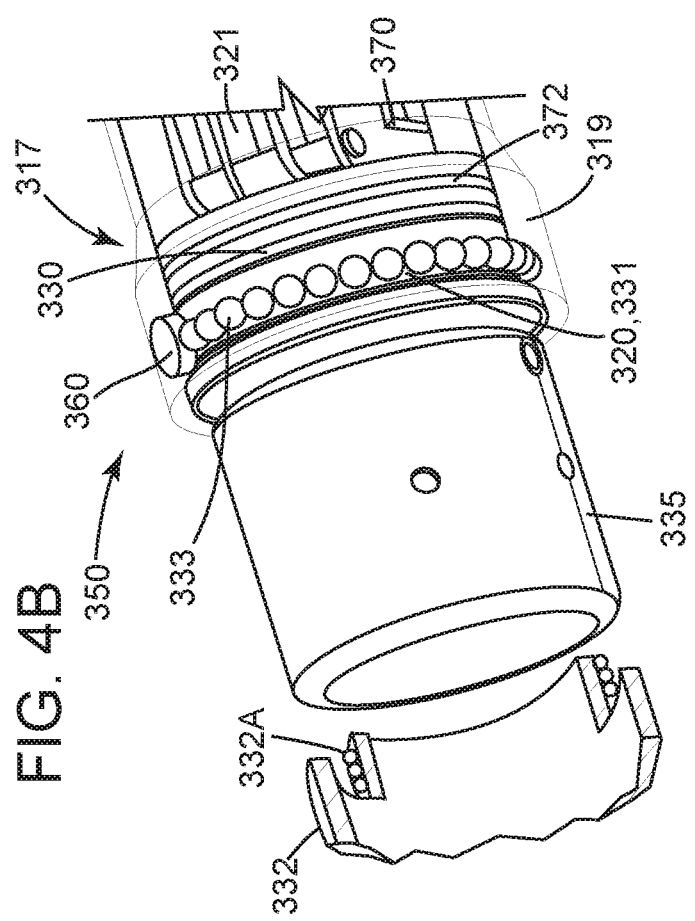
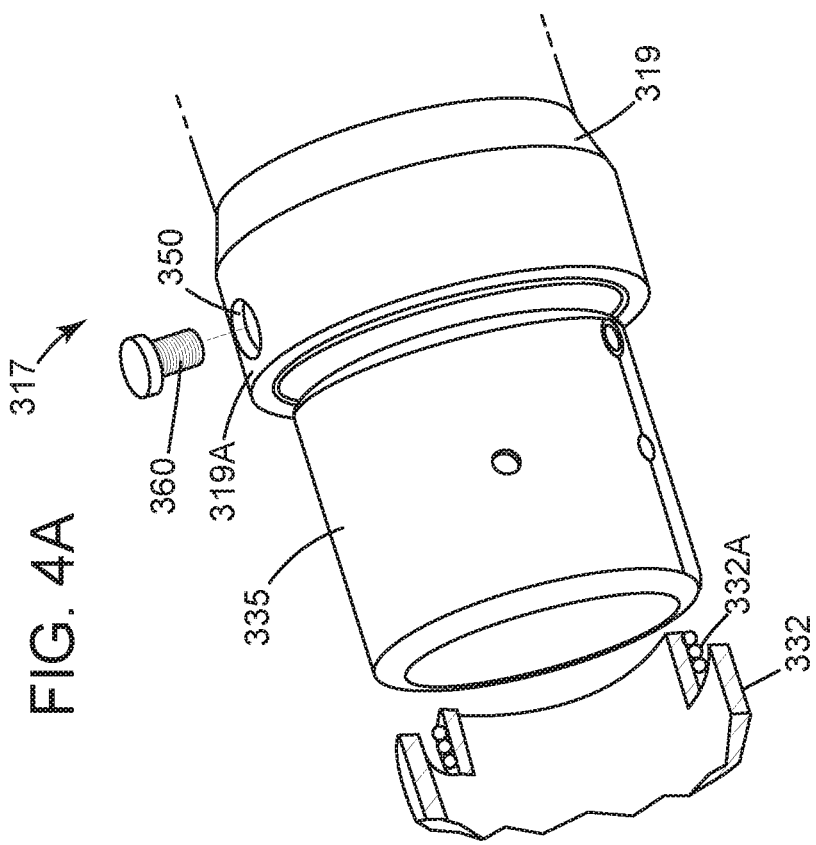
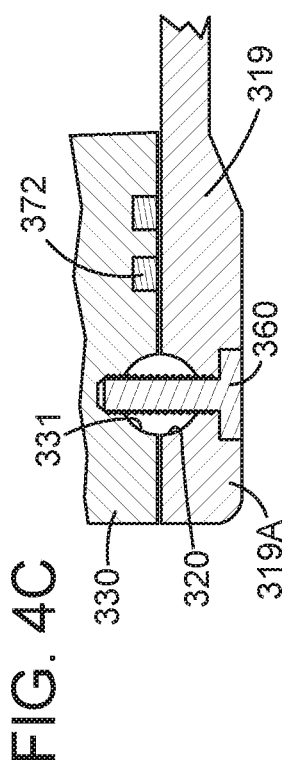

STREAMER CONNECTING MODULE AND METHOD

BACKGROUND

Technical Field

Embodiments of the subject matter disclosed herein generally relate to methods and systems and, more particularly, to mechanisms and techniques for connecting various streamer sections to each other.

Discussion of the Background

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown in FIG. 1, a vessel 110 tows plural detectors 112, (e.g., hydrophones, geophones or accelerometers) which are disposed along a cable 114. Cable 114 together with its corresponding detectors 112 are sometimes referred to, by those skilled in the art, as a streamer 116. Vessel 110 may tow plural streamers 116 at the same time, as shown in the figure. The streamers may be disposed horizontally, i.e., lie at a constant depth relative to the ocean surface 118. Also, the plural streamers 116 may form a constant angle (i.e., the streamers may be slanted) with respect to the ocean surface or they may have a variable-depth profile (Broadseis, CGG). The totality of streamers and associated equipment (e.g., birds as disclosed in U.S. Pat. No. 9,475,553, the entire content of which is incorporated herein by reference) form a streamer spread.

Still with reference to FIG. 1, vessel 110 may also tow a seismic source array 120 configured to generate an acoustic wave. The acoustic wave propagates downward and penetrates the seafloor, eventually being reflected by a reflecting structure. The reflected acoustic wave propagates upward and is detected by detectors 112.

The streamers are towed by the vessel along a pre-plot path X. Each streamer includes plural streamer sections. As an example, FIG. 1 shows a streamer $116_k$, where k can vary between 1 and 30, having many sections connected to each other by a streamer connecting module 117. FIG. 1 labels, for simplicity, only two streamer sections $116_i$ and $116_{i+1}$ connected by module 117, where "i" can vary between 1 and 100. FIG. 1 also shows a streamer 116 having a head 116A and a tail 116B.

During the seismic acquisition phase, the streamers 116 are maintained with a certain offset form each other along the cross-line direction Y by using a combination of ropes 120 and deflectors 122 located at the head of the streamers, as shown in FIG. 1. Also, for maintaining a certain depth of the streamer heads 116A, one or more head buoys 124 are connected to corresponding streamer heads. Similar buoys (not shown), called tail buoys, are connected to the tail end 116B of the streamers.

During the seismic acquisition process, as the vessel advances along the pre-plot path X, large forces/tensions appear in the streamer sections and the modules connecting them. For these reasons, a strength member is present inside each streamer section. The same tension is present in each streamer connecting module 117. Thus, the housing of the streamer connecting module 117 and also the connecting parts of the streamer sections need to be made to have a large thickness to withstand the tensions present in these elements while the vessel moves. The large thickness of these parts induce various problems, due to their size and weight, e.g., noise along the streamer.

Thus, there is a need to streamline the connecting modules along the streamer for having a reduced size and weight. Accordingly, it would be desirable to provide systems and methods with such capabilities.

SUMMARY

According to an embodiment, there is a streamer connecting module for connecting two streamer sections. The streamer connecting module includes a housing extending along a longitudinal axis (L) so that first and second ends are opposite to each other; a first streamer connecting part fixedly attached at the first end of the housing; a second streamer connecting part fixedly attached at the second end of the housing; first plural balls located between the first streamer connecting part and the first end of the housing; and a first conduit formed at an interface between the first streamer connecting part and the first end of the housing for accommodating the first plural balls.

According to another embodiment, there is a method for assembling a streamer connecting module. The method includes providing a housing extending along a longitudinal axis (L) so that first and second ends are opposite to each other, and a first streamer connecting part; attaching the first streamer connecting part to the first end of the housing; inserting first plural balls between the first streamer connecting part and the first end of the housing; and inserting a first pin into a first hole in the first end of the housing, to prevent the first plural balls to rotate relative to the longitudinal axis.

According to yet another embodiment, there is a streamer for acquiring seismic data in a marine environment. The streamer includes a first streamer section having plural first seismic sensors; a second streamer section having plural second seismic sensors; and a connecting module for connecting the first streamer section to the second streamer section. The streamer connecting module includes a housing extending along a longitudinal axis (L) so that first and second ends are opposite to each other, a first streamer connecting part fixedly attached at the first end of the housing, a second streamer connecting part fixedly attached at the second end of the housing, first plural balls located between the first streamer connecting part and the first end of the housing, and a first conduit formed at an interface between the first streamer connecting part and the first end of the housing for accommodating the first plural balls.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 2A and 2B illustrate a streamer common, well-known connecting module that connects two streamer sections to each other;

FIG. 4A shows a connection between a streamer section and a streamer connecting module;

FIG. 4B shows various components located inside the streamer connecting module;

FIG. 4C shows a pin that is introduced inside a conduit that holds plural balls for preventing a streamer connecting part to rotate relative to a housing of a streamer connecting module.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a streamer connecting module for connecting together two streamer sections. However, the embodiments to be discussed next are not limited to these elements. The streamer connecting module may be used to connect other elements used in a seismic marine acquisition system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
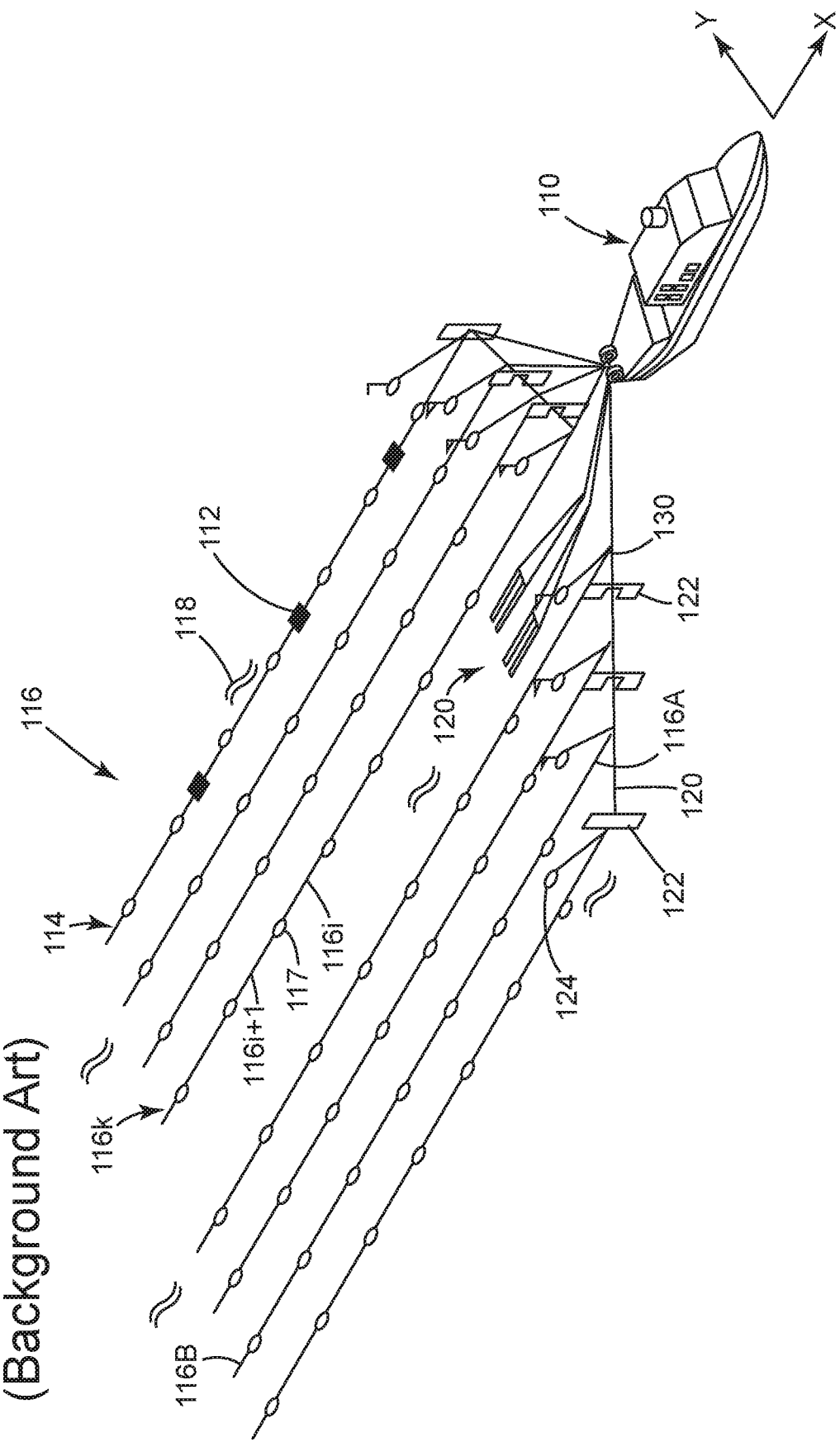
FIG. 1 is a schematic diagram of a conventional seismic data acquisition system having plural horizontal streamers.

A well-known streamer connecting module 217 is illustrated in FIGS. 2A and 2B. FIG. 2A shows the streamer connecting module 217 having a housing 219 that defines an internal chamber 221. Various elements (e.g., electrical, communication wires) may be located inside internal chamber 221 when the streamer connecting module is connecting the streamer modules as in FIG. 1. For simplicity, all the internal elements are omitted in FIGS. 2A and 2B.

FIG. 2A also shows streamer connecting parts 230 and 240 for receiving first streamer section 232A and second streamer section 232B, respectively. First streamer section 232A is screwed into coupling nut 237A and this coupling nut is rotatably attached to connecting part 230 through balls 236A. The rotation of the streamer section 232A relative to the streamer connecting part 230 may be achieved, for example, by placing the plural balls 236A in a space 238 defined between the streamer section 232A and the streamer connecting part 230, as illustrated in FIG. 2A. The second streamer section 232B has a coupling nut 237B that is screwed into connecting part 240 as shown in FIG. 2A. Second streamer section 232B is rotatably attached to coupling nut 237B through set of balls 236B. Streamer connecting parts 230 and 240 are part of the streamer connecting module 217, and removably connected to the housing 219 of the streamer connecting module 217. One of the streamer connecting part is a female connector while the other one is a male connector.

Streamer connecting part 230 has a fastening nut 244A that fastens directly to one end 219A of the housing 219 and streamer connecting part 240 has a fastening nut 244B that fastens directly to an opposite end 219B of the housing 219. Streamer connecting part 230 also has a coupling nut 237A that fastens directly to the streamer section 232A. FIG. 2B shows a detail of the connection between the fastening nut 244A, end 219A of the housing 219, and streamer connecting part 230. Note that the thickness of each of these elements has to be substantial in order to withstand the pulling forces that are applied by the vessel to the streamer sections.

Figure 3A:
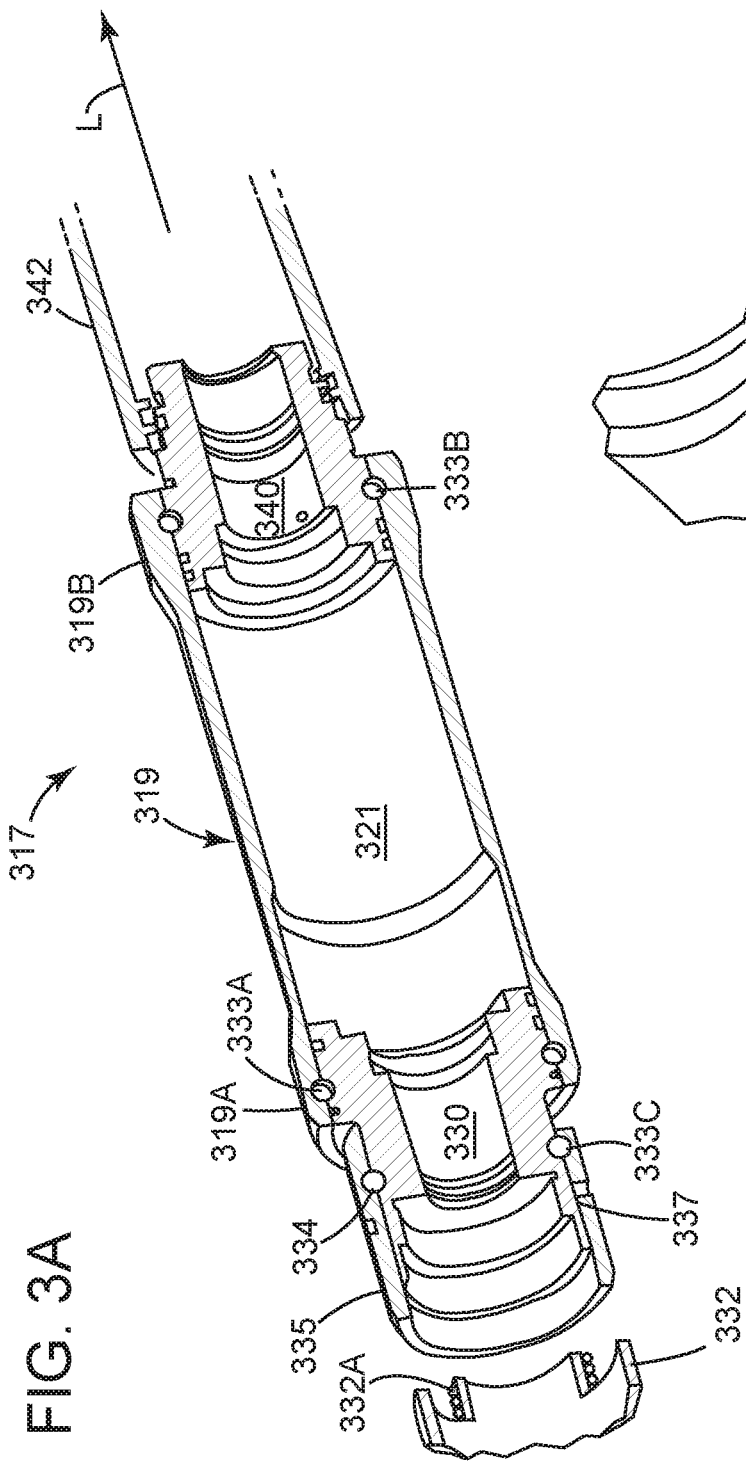
FIGS. 3A and 3B illustrate a streamer connecting module that connects two streamer sections to each other without fastening nuts.
Figure 3B:
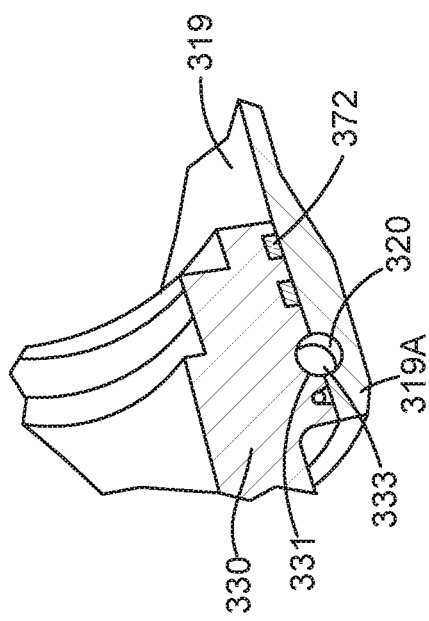

According to an embodiment illustrated in FIGS. 3A and 3B, the thickness of the various elements that are connected to each other, as discussed above with regard to FIG. 2B, can be reduced by completely removing the fastening nuts and connecting the streamer connecting parts directly to the housing. More specifically, FIG. 3A shows a streamer connecting module 317 that includes a housing 319 that defines an internal chamber 321. Both housing 319 and internal chamber 321 extend along longitudinal axis L. Streamer connecting part 330 is fixedly connected to a first end 319A of the housing 319 while streamer connecting part 340 is also fixedly connected to a second end 319B, opposite to the first end 319A, of the housing 319. One streamer connecting part may be a male part and the other connecting part may be a female part.

The connections between the streamer connecting parts and the housing are now discussed in more detail with regard to FIG. 3B. FIG. 3B shows a groove 320 formed in the first end 319A of the housing 319 and a corresponding groove 331 formed in the streamer connecting part 330. When the streamer connecting part 330 enters inside the housing 319, the two grooves 320 and 331 form a conduit that extends circularly around the exterior diameter of the streamer connecting part 330 and also around the interior diameter of the housing 319. Plural balls 333A, formed from a material resistant to corrosion (e.g., steel, composite, etc.), are provided inside conduit 320, 331.

FIGS. 4A and 4B show at least one hole 350 formed in the housing 319 and having a diameter substantially equal or larger than a diameter of the balls 333. The balls are initially entered in conduit 320, 331 through hole 350 until the conduit is full (see FIG. 4B). Then, a screw or pin 360 is screwed into the hole 350 to prevent the balls from coming out. The screw or pin 360 extends through the first end 319A of the housing 319, into the conduit 320, 331 (e.g., perpendicular), and then into the housing 319, as illustrated in FIG. 4C, to prevent a rotating motion of the streamer connecting part 330 relative to housing 319. For this reason, screw or pin 360 is also called anti-twisting pin. A special tool may be used to screw or unscrew screw 360. If a pin is used instead of a screw, then the pin may be glued or welded to the housing 319.

FIG. 4B also shows some electrical components 370 located inside interior chamber 321, for example, electronics for signal amplifying, signal processing, or for other seismic data processing that is performed in a streamer. FIGS. 3B and 4B show seals 372 distributed between the streamer connecting part and the housing for preventing the ambient water entering the interior chamber 321.

With regard to FIG. 4B, according to this embodiment, the coupling nut 335 can rotate relative to housing 319 to connect to the first streamer section 332, but streamer connecting part 330, although connected with balls 333 to housing 319, cannot rotate relative to housing 319 due to the one or more screws or pins 360.

Although FIGS. 4A to 4C show only the connection between the first streamer connecting part 330 and the housing 319, a similar connection is used between the second streamer connecting part 340 and the housing. In this regard, FIG. 3A shows a first plurality of balls 333A at the first end 319A and a second plurality of balls 333B at the second end 319B. Each plurality of balls is placed in a conduit as discussed above with regard to FIG. 3B and a corresponding hole through which the balls were inserted is closed with a screw or pin for preventing a rotation of the plurality of balls inside the conduit. Note that FIG. 3A also shows third plural balls 333C located at an interface 337 between the first streamer connecting part 330 and a coupling nut 335. For this arrangement, because no pin or screw is provided in the conduit 334 holding the plural balls 333C, the coupling nut 335 can rotate relative to the first streamer connecting part 330 (i.e., the third plural balls act as ball bearings). FIG. 3A shows the streamer section 332 having a thread 332A, which enters inside the coupling nut 335 and couples to a corresponding thread on the inside of the coupling nut, so that the coupling nut 337 can be attached to the streamer section 332. The same arrangement can be used for the second streamer connecting part and the second streamer section.

The configurations illustrated in FIGS. 3A to 4C reduce an outer diameter of housing 319, especially at ends 319A and 319B, which results in a reduced weight of the entire assembly. Further, the reduced diameter of the housing limits the hydrodynamic turbulence created by the streamer connecting module while being towed underwater, and also reduces the cost of the parts needed for a seismic survey.

Figure 5:
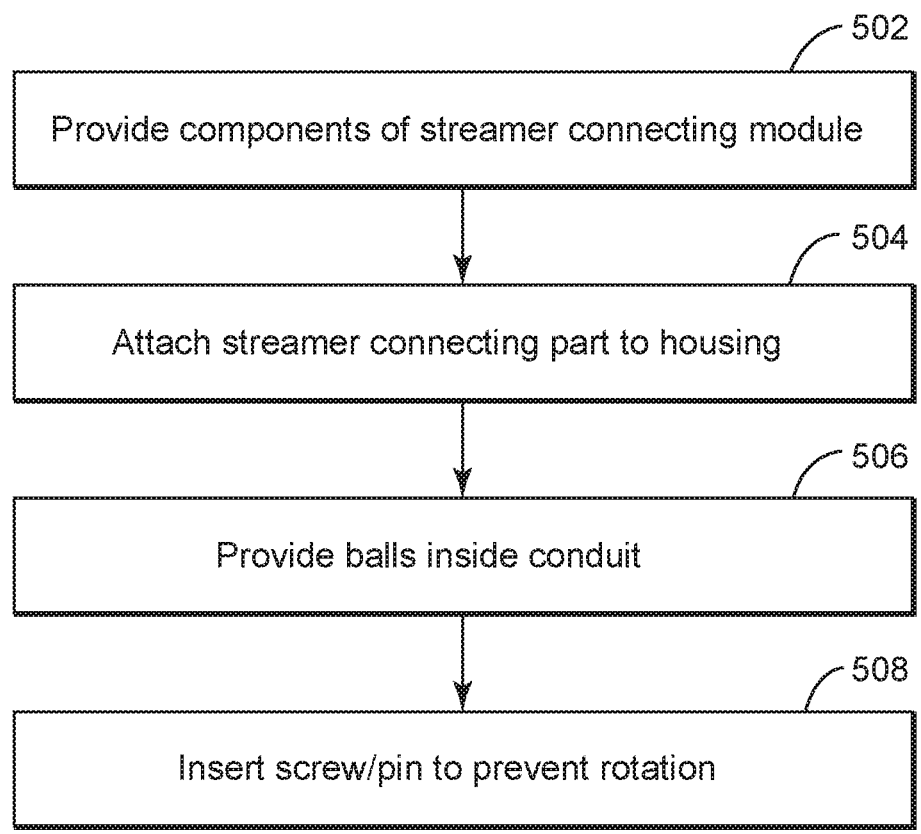
FIG. 5 is a flowchart of a method for assembling a streamer connecting module without fastening nuts.

A method for assembling a streamer connecting module is now discussed with regard to FIG. 5. The method 500 includes a step 502 of providing the components of a streamer connecting module 317, i.e., housing 319, first streamer connecting part 330, second streamer connecting part 340, balls 333, and screws or pins 360, as shown in FIGS. 3A and 4B. These elements may be located on the back deck of a vessel that tows the streamers or at a land facility. The first streamer connecting part 330 is attached to housing 319 in step 504, by inserting the connecting part 330 inside the housing 319. When the two parts are in position, balls 333 are placed inside conduit 320, 331, through hole 350, in step 506. After the conduit is full with balls, the screw 360 is attached in step 508 to a first end 319A of the housing 319, so that the screw enters inside the conduit and prevents the first streamer connecting part 330 to rotate relative to housing 319 due to balls 319 acting as ball bearings. The method then continues to repeat the same steps for the second streamer connecting part 340. When both streamer connecting parts are attached to the housing, the first and streamer sections may be attached to the streamer connecting parts and then the assembled streamer may be deployed in water for conducting seismic surveying and acquiring the seismic data.

The streamer sections 332 and 342 may be identical or different. For example, the streamer section 332 may include only hydrophones for recording the pressure changes while the streamer section 342 may include only accelerometers for measuring and recording particle motion. In one application, instead of connecting two streamer sections to each other with the streamer connecting module, it is possible to connect a streamer section and another part of the streamer to each other. This another part may be a bird (a device used to control a position of the streamer in water), or a recovery system, or a shorter streamer, or a tail buoy.

The various configurations of the streamer connecting module discussed above may simply replace the existing streamer connector as the connectors to the streamer sections are similar. Thus, no down-time for retrofitting the existing streamers is necessary.

The disclosed embodiments provide a streamer connecting module and a method for assembling such module. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A streamer connecting module for connecting two streamer sections, the streamer connecting module comprising:
a housing extending along a longitudinal axis (L) so that first and second ends are opposite to each other;
a first streamer connecting part fixedly attached at the first end of the housing;
a second streamer connecting part fixedly attached at the second end of the housing;
first plural balls located between the first streamer connecting part and the first end of the housing;
a first conduit formed at an interface between the first streamer connecting part and the first end of the housing for accommodating the first plural balls; and
a first pin inserted through a first hole in the first end of the housing, the first pin extending inside the first conduit to prevent the first plural balls to rotate relative to the longitudinal axis.

2. The streamer connecting module of claim 1, further comprising:
second plural balls located between the second streamer connecting part and the second end of the housing; and
a second conduit formed at an interface between the second streamer connecting part and the second end of the housing for accommodating the second plural balls.

3. The streamer connecting module of claim 2, further comprising:
a second pin inserted through a second hole in the second end of the housing, the second pin extending inside the second conduit to prevent the second plural balls to rotate relative to the longitudinal axis.

4. The streamer connecting module of claim 1, wherein the first streamer connecting part is a male part and the second streamer connecting part is a female part.

5. The streamer connecting module of claim 1, wherein the first streamer connecting part is configured to connect to a first streamer section and the second streamer connecting part is configured to connect to a second streamer section.

6. The connecting module of claim 1, further comprising:
electronics located inside the housing and configured to process seismic data received from seismic sensors.

7. The connecting module of claim 1, further comprising:
seals for preventing ambient water to enter inside the housing, wherein the seals are located between the housing and the first and second streamer connecting parts.

8. The streamer connecting module of claim 1, wherein there is no fastening nut between the first and second streamer connecting parts and the housing.

9. The streamer connecting module of claim 1, further comprising:
third plural balls located at an interface between the first streamer connecting part and a first streamer section.

10. The streamer connecting module of claim 9, wherein the first streamer section is configured to rotate relative to the first streamer connecting part due to the third plural balls.

11. A method for assembling a streamer connecting module, the method comprising:
providing a housing extending along a longitudinal axis (L) so that first and second ends are opposite to each other, and a first streamer connecting part;
attaching the first streamer connecting part to the first end of the housing;
inserting first plural balls into a first conduit formed at an interface between the first streamer connecting part and the first end of the housing; and
inserting a first pin into a first hole in the first end of the housing, the first pin extending inside the conduit to prevent the first plural balls to rotate relative to the longitudinal axis.

12. The method of claim 11, further comprising:
attaching a second streamer connecting part to the second end of the housing;
inserting second plural balls in a second conduit formed between the second streamer connecting part and the second end of the housing; and
inserting a second pin into a second hole in the second end of the housing, the second pin extending through the second conduit to prevent the second plural balls to rotate relative to the longitudinal axis.

13. The method of claim 11, further comprising:
connecting the first streamer connecting part to a first streamer section; and
connecting the second streamer connecting part to a second streamer section.

14. The method of claim 11, further comprising:
providing electronics inside an interior of the housing, wherein the electronics are configured to process seismic data received from seismic sensors.

15. The method of claim 11, wherein there is no fastening nut between the first streamer connecting part and the housing.

16. The method of claim 11, further comprising:
providing third plural balls at an interface between the first streamer connecting part and a first streamer section.

17. The method of claim 16, wherein the first streamer section is configured to rotate relative to the first streamer connecting part due to the third plural balls.

18. A streamer for acquiring seismic data in a marine environment, the streamer comprising
a first streamer section having plural first seismic sensors;
a second streamer section having plural second seismic sensors; and
a connecting module for connecting the first streamer section to the second streamer section,
wherein the streamer connecting module includes,
a housing extending along a longitudinal axis (L) so that first and second ends are opposite to each other,
a first streamer connecting part fixedly attached at the first end of the housing,
a second streamer connecting part fixedly attached at the second end of the housing,
first plural balls located between the first streamer connecting part and the first end of the housing,
a first conduit formed at an interface between the first streamer connecting part and the first end of the housing for accommodating the first plural balls, and
a first pin inserted through a first hole in the first end of the housing, the first pin extending inside the first conduit to prevent the first plural balls to rotate relative to the longitudinal axis.

* * * * *